INVENTOR
STANLEY J. KOLODY

Dec. 15, 1970     S. J. KOLODY     3,546,801

ADJUSTABLE CALENDAR

Filed Aug. 8, 1969     3 Sheets-Sheet 2

FIG. 2

REGULAR YEAR

INVENTOR.
STANLEY J. KOLODY
BY Evan D Roberts
ATTORNEY.

Dec. 15, 1970     S. J. KOLODY     3,546,801

ADJUSTABLE CALENDAR

Filed Aug. 8, 1969     3 Sheets—Sheet 3

FIG.3

LEAP YEAR    28

FIG.6

INVENTOR.
STANLEY J. KOLODY
BY Evan D. Roberts
ATTORNEY.

United States Patent Office 3,546,801
Patented Dec. 15, 1970

3,546,801
ADJUSTABLE CALENDAR
Stanley J. Kolody, 1750 Burr Oak Road,
Homewood, Ill. 60430
Filed Aug. 8, 1969, Ser. No. 848,490
Int. Cl. G09d *3/00*
U.S. Cl. 40—109                                   6 Claims

ABSTRACT OF THE DISCLOSURE

A frame having month apertures with days of the week indicia and opening into a month slot. A month sheet in the frame month slot and having monthly numeral indicia. A seven column chart representing seven days of the week and having century numeral indicia grouped thereon. A century aperture in the frame and opening into a century slot in the frame which is adapted to receive a century index insert to cooperate with the seven column chart.

SUMMARY OF THE INVENTION

This invention relates to an adjustable calendar which can be adjustably manipulated to provide either a calendar for a given century or a calendar in perpetuity.

Also, the calendar of this invention provides a day of the week chart and a cooperating century index insert selection apparatus in a frame to provide a means for determining the days of the week of the first day of January of any given year to be used in cooperation with an adjustable calendar of the frame. The indicia of the chart and cooperating century index insert are visible at all times for ready and versatile selection and utilization.

Further, the structure and arrangement of the elements of the calendar of this invention provide an adjustable perpetual calendar having fewer numeral indicia required than that of known types of perpetual calendars. Further, this invention facilitates the use of only a single set of century indicia for both regular and leap years. In this regard, this invention does not require two or more indicia faces on the frame thereof, but facilitates the use of one face only for all determinations and cooperating adjustments.

Further, the structure and arrangement of the elements of this invention facilitate the same type of manipulations and readings for both regular and leap years. Also, the calendar of this invention can be adjusted and manipulated to represent a calendar for either any given year or for perpetuity.

Other advantages and novel aspects of the invention will become apparent upon examination of the following detailed description in conjunction with the accompanying drawings wherein:

FIG. 2 is a front plan view of a month sheet showing the month indicia for a regular year which is utilized with the frame;

FIG. 3 is a back plan view of the month sheet shown in FIG. 2 showing the month indicia for a leap year which is utilized with the frame;

FIG. 4 is a partial sectional view taken along line 4—4 of FIG. 1 showing the structure of the frame with a month sheet inserted in the month slot thereof;

FIG. 5 is a plan view of the century index insert;

FIG. 6 is a partial plan view of the frame face showing the seven column chart in cooperation with the century index insert; and FIG. 7 is a partial sectional view taken along line 7—7 of FIG. 6 showing the century index insert inserted in the frame.

Figure 1:
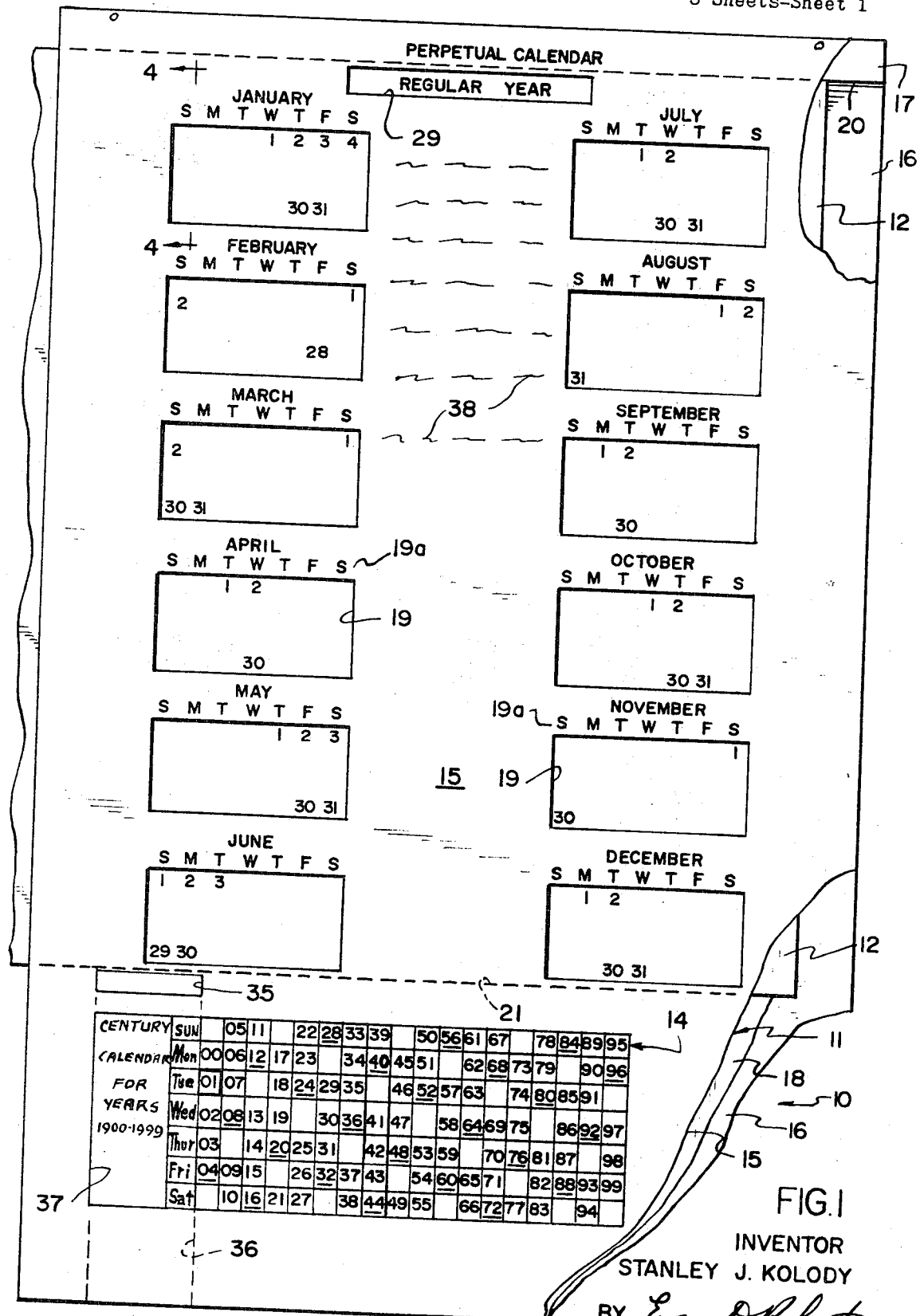
FIG. 1 is a partially broken away front plan view of the invention showing the structural aspects of the frame thereof and the cooperating indicia arrangement.

An adjustable calendar illustrating this invention is generally designated by the numeral 10 (FIG. 1) and includes, broadly, a frame 11, month sheet 12 (FIGS. 1–3), a century index insert 13 (FIGS. 5 and 6), and a seven column chart.

The frame 11 has a front sheet panel 15 separated from a back sheet 16 panel by a top spacer 17 and a bottom spacer 18. The front sheet panel 15 is provided with twelve apertures 19, one for each month of a year, and day of the week indicia 19a is positioned vertically adjacent (above) each of the apertures 19. The top and bottom spacers 17 and 18 are respectively provided with parallel edge surfaces 20 and 21 to provide a slot 22 (FIG. 4) therebetween, and between the front and back sheet panels 15 and 16.

The month sheet 12 is adapted to be slidable in the frame slot 22, and has twelve groups of monthly indicia 25 for a regular or non-leap year arranged on one surface 26 thereof. The twelve monthly indicia are arranged so that when the sheet 12 is moved in the slot 22, the groups of monthly indicia 25 will respectively appear through an aperture 19 respectively representing each month of the year.

Further, the regular monthly indicia 25 are grouped and arranged on the front 26 month sheet 12, so that when the month sheet 12 is positioned with the day of a month of any given regular year vertically adjacent (beneath) the day of the week indicia 19a for that month, the apertures 19 of the front panel 15 will respectively expose monthly indicia 25 from the month sheet beneath appropriate weekday indicia to provide a twelve month regular calendar for that given regular year.

Similarly, the month sheet 12 is provided with groups of monthly indicia 27 for a leap year (non-regular year) arranged on a back surface 28 thereof. The leap year monthly indicia 27 are grouped and so arranged on the back surface 28 whereby, when sheet 12 is removed from the slot 22, turned over, and reinserted in the slot 22, the groups of leap year monthly indicia 27 will appear through respective apertures 19 to represent each month of a year.

Leap year monthly indicia 27 are grouped and arranged on the back surface 28 of month sheet 12, so that when the month sheet 12 is positioned with the day of a month of any leap year vertically adjacent (beneath) the weekday indicia 19a for that month, the apertures 19 of the front panel 15 will respectively expose monthly leap year indicia 27 from the month sheet beneath appropriate weekday indicia to provide a twelve month leap year calendar for that given leap year.

The front sheet panel 15 of the frame 11 is provided with an aperture 29 adapted to register with the indicia indicating which side of the month sheet 12 is being exposed through the apertures 19. Also, the month sheet 12 could comprise separate sheets for regular and leap years to be used separately as desired.

The century index insert 13 has the seven days of the week represented in repetitive successive fashion along the right side thereof (FIGS. 1, 5 and 6), and is adapted to be inserted through an aperture 35 (FIGS. 1, 6 and 7) into a century slot 36 in the bottom spacer 18. The century slot 36 is positioned transversely to a seven column chart and is provided with an aperture 37 which is adapted to expose seven days of the week of the century index insert in respective selective registry with the seven columns of the chart 14.

The index 13 has centuries indicated thereon by the year 01 thereof, and the centuries are grouped thereon adjacent the day of the week indicated on the index insert 13 according to the day of the week of the first day of the year 01 of the respective century.

The frame back panel 16 has the successive days of the week beginning with Sunday, indicated thereon in respective registry with the seven columns of the chart 14 and to be exposed through said aperture 37 when the insert 13 is removed. The years of the centuries are indicated and grouped in the seven columns of the chart 14 representing the successive days of the week according to the first days of the year of each of the years of the centuries. The leap years are underlined on the chart to call the attention of the reader.

For operation of this calendar for a given century only, such as 1900–1999 (FIG. 1), the century index insert 13 is removed to expose the successive days of the week for the respective seven columns of the chart 14 for this century (in this case, Sunday through Saturday). The desired year of this century (69 for example) is selected and the day of the week column (Wednesday) thereof is noted. The month sheet 12 is moved in slot 22 with the regular year indicia 25 exposed through the apertures 19 until the first day of January for 1969 (Wednesday) appears adjacent (beneath) W for Wednesday and a 1969 calendar is thereby exposed through the apertures 19.

For operation of this calendar to provide a calendar for any year of any century, the century index insert 13 (FIG. 5) is inserted through aperture 35 into slot 36 (FIGS. 6 and 7) to present the continuous successive days of the week in adjacent registry with the seven columns of the chart 14. The year for which a calendar is desired is noted and could be 2065 for example. The century index 13 is moved in slot 36 until the century indicia 2001, for the twenty-first century including 2065, is in registry with the year 01 of chart 14. The day of the week shown on the insert 13 which is in registry with one of the seven horizontal columns of chart 14 that contains the chosen year (65) of the twenty-first century, is the first day of the year 2065. In this example, the day is Thursday.

The month sheet 12 is then moved in slot 22 with the regular year indicia 25 exposed through the apertures 19 until the first day of January for 2065 (Thursday) appears adjacent (beneath) T for Thursday and a 2065 calendar is exposed through the apertures 19.

The above operational comments are to be printed on the front sheet panel 15 as an instructional note 38. Special circumstances which are self-explanatory are also covered by the instruction ote 38 and read as follows:

"For English calendar adjustment, deduct 11 days prior to September 3, 1752 inasmuch as days of September 3rd to 13th 1752 are nonexistent. All others using Gregorian calendar deduct 10 days prior to October 5, 1582 inasmuch as October 5th to 15th 1582 are nonexistent. No provisions are made for these days on these conversion charts. Leap years are years divisable by 4, except at the beginning of a century and leap year centuries are divisable by 400 only. Thus, only years 1600, 2000, 2400, etc. are leap year centuries."

It is to be understood that the invention is not to be limited to the specific constructions and arrangements shown and described, as it will be understood to those skilled in the art that certain changes may be made without departing from the principles of the invention.

What is claimed is:

1. An adjustable calendar comprising a frame having a month slot therethrough adapted to slidably receive a sheet therein, said frame having a plurality of apertures in a front sheet panel thereof and opening into said frame month slot therein with the days of the week and months of a year sequentially represented vertically adjacent thereto, a month sheet slidable with said frame slot and having groups of monthly numeral indicia positioned thereon to be respectively exposed through said frame openings to represent the respective months of a year when the month sheet is positioned with one date of any month of said year vertically aligned with the correct day of the week thereof, a seven column chart on said frame front surface with the columns corresponding to successive days of a week as represented adjacent said frame apertures, year indicia numerals representing the years of a century and respectively grouped in said chart columns according to the first day of said years, a century slot formed in said frame transverse to said seven chart columns and adapted to receive an insert to cooperate with said chart, a century aperture in said frame front surface and opening into said century slot adjacent said chart, and a century index insert adapted to be slidably inserted in said century slot and having successive days of the week repeated therealong and exposed through said century aperture in corresponding cooperating relation with the columns of said chart, said century index insert having centuries indicia in groups thereon and adapted to be exposed through said century aperture with the day of the week of the century index insert corresponding to the day of the week of the first day of the first year of the respective grouped centuries, whereby a calendar for any chosen year may be established in perpetuity by positioning said century insert along said century slot with the chosen century thereon aligned with the column of the seven column chart containing the first year numeral of said century and by positioning said month sheet within said frame with the first day of January vertically aligned with the day of the week of the January frame aperture corresponding to the day of the week of the century index insert which is aligned with the column of the seven column chart containing the particular year of the century desired.

2. A calendar as defined in claim 1 wherein the indicia shown on said century index insert for a given century is also displayed on said frame adjacent to and in cooperation with said chart to provide a calendar for said given century.

3. A calendar as defined in claim 2 wherein said indicia displayed adjacent said chart is displayed through said century aperture whereby said calendar for said given century will be provided when said century index insert is removed.

4. A calendar as defined in claim 1 wherein said leap year numerals on said chart are differentiated from said non-leap year numerals on said chart and said month sheet has said monthly indicia represented thereon in two groups comprising leap year and non-leap year groups for coordinated respective use with the leap year and non-leap year chart numerals.

5. A calendar as defined in claim 2 wherein said leap year numerals on said chart are differentiated from said non-leap year numerals on said chart and said month sheet has said monthly indicia represented thereon in two groups comprising leap year and non-leap year groups for coordinated respective use with the leap year and non-leap year chart numerals.

6. A calendar as defined in claim 3 wherein said leap year numerals on said chart are differentiated from said non-leap year numerals on said chart and said month sheet has said monthly indicia represented thereon in two groups comprising leap year and non-leap year groups for coordinated respective use with the leap year and non-leap year chart numerals.

References Cited

UNITED STATES PATENTS

| | | | |
|---|---|---|---|
| 786,618 | 4/1905 | Ball et al. | 40—109 |
| 2,575,555 | 11/1951 | La Plante | 40—109 |
| 2,668,382 | 2/1954 | Spencer | 40—109 |
| 2,847,778 | 8/1958 | Opoczynski | 40—109 |
| 3,201,884 | 8/1965 | Aughey | 40—109 |
| 3,209,478 | 10/1965 | Burkert | 40—109 |

FOREIGN PATENTS

| | | | |
|---|---|---|---|
| 571,544 | 11/1943 | Great Britain | 40—109 |

JEROME SCHNALL, Primary Examiner

J. H. WOLFF, Assistant Examiner